(12) United States Patent
Schwarz

(10) Patent No.: US 10,514,447 B2
(45) Date of Patent: Dec. 24, 2019

(54) METHOD FOR PROPAGATION TIME CALIBRATION OF A LIDAR SENSOR

(71) Applicant: Robert Bosch GmbH, Stuttgart (DE)

(72) Inventor: Hans-Jochen Schwarz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 15/265,224

(22) Filed: Sep. 14, 2016

(65) Prior Publication Data

US 2017/0082738 A1   Mar. 23, 2017

(30) Foreign Application Priority Data

Sep. 18, 2015   (DE) .......................... 10 2015 217 912

(51) Int. Cl.
*G01S 7/497* (2006.01)
*G01S 17/10* (2006.01)
*G01S 17/93* (2006.01)

(52) U.S. Cl.
CPC ............ *G01S 7/497* (2013.01); *G01S 7/4865* (2013.01); *G01S 17/10* (2013.01); *G01S 17/936* (2013.01)

(58) Field of Classification Search
CPC ........ G01S 7/4811; G01S 7/487; G01S 7/497; G01S 17/10; G01S 7/4868
See application file for complete search history.

(56) References Cited

U.S. PATENT DOCUMENTS

| | | | |
|---|---|---|---|
| 2004/0070745 A1* | 4/2004 | Lewis ................... | G01S 7/4811 356/5.01 |
| 2004/0085526 A1* | 5/2004 | Gogolla ................ | G01S 7/4861 356/4.01 |
| 2014/0118718 A1* | 5/2014 | Jungwirth ............... | G01S 7/493 356/5.09 |

* cited by examiner

*Primary Examiner* — Luke D Ratcliffe
(74) *Attorney, Agent, or Firm* — Gerard A. Messina; Norton Rose Fulbright US LLP

(57) ABSTRACT

A method for propagation time calibration of a LIDAR sensor which includes a pulsed light source, a detector surface with a plurality of optoelectronic elements for receiving light pulses of the light source reflected on objects and for converting these light pulses into electronic signals, and an electronic evaluation circuit for detecting the light pulses and for measuring the propagation times thereof. In the method, the measured propagation times are corrected with respect to the propagation times of the electronic signals in the evaluation circuit by decoupling, for at least some of the light pulses, a portion of the light, using a beam splitter at the light source, and using detection times of the decoupled light pulses as a time reference. The detector surface is illuminated with the decoupled light via a light-scattering system and used for detecting the decoupled light pulses.

6 Claims, 4 Drawing Sheets

METHOD FOR PROPAGATION TIME CALIBRATION OF A LIDAR SENSOR

CROSS REFERENCE

The present application claims the benefit under 35 U.S.C. § 119 of German Patent Application No. DE 102015217912.5 filed on Sep. 18, 2015, which is expressly incorporated herein by reference in its entirety.

FIELD

The present invention relates to a method for propagation time calibration of a LIDAR sensor which includes a pulsed light source, a detector surface with a plurality of optoelectronic elements for receiving light pulses of the light source reflected on objects and for converting these light pulses into electronic signals, and an electronic evaluation circuit for detecting the light pulses and for measuring the propagation times thereof, in the method the measured propagation times being corrected with respect to the propagation times of the electronic signals in the evaluation circuit by decoupling, for at least some of the light pulses, a portion of the light, using a beam splitter at the light source, and using detection times of the decoupled light pulses as a time reference.

BACKGROUND INFORMATION

LIDAR sensors are used, for example, in driver assistance systems for motor vehicles for detecting the traffic environment, for example locating preceding vehicles and other obstacles.

The electrooptical (optoelectronic) elements of the detector surface are situated in a row or in a plane, and are sensitive to light that has been received from a specific direction for the particular element, so that a one-dimensional or two-dimensional image is obtained. By measuring the propagation times of the light pulses, the distances from the reflecting objects may also be determined, so that a depth-resolved two-dimensional or three-dimensional image of the surroundings is obtained.

However, the measured signal propagation times are a function not only of the distances from the objects, but also of the properties of the evaluation circuit, since relaying the electronic signals in the evaluation circuit also requires a certain amount of time, so that the detection times ultimately measured are delayed by the propagation time of the electronic signals in the evaluation circuit. During the manufacture of the LIDAR sensors, at the end of the production line it is therefore customary to carry out a calibration in which the propagation time of the electronic signals is determined.

However, the propagation times of the electronic signals in the evaluation circuit may change over time due to temperature changes or aging effects. In one conventional method, these effects are detected and compensated for by decoupling light pulses directly at the light source, using a beam splitter, and deflecting them onto a reference surface which, the same as the detector surface, is equipped with optoelectronic elements for receiving the decoupled light. The detection times for the decoupled light pulses on the reference surface may then be used as a time reference, but only under the condition that there is a high level of symmetry between the detector surface and the reference surface as well as the associated electronic connections to the evaluation circuit, so that the propagation times of the electronic signals from the detector surface and the reference surface sufficiently match.

SUMMARY

An object of the present invention is to provide a method which allows easier propagation time calibration.

This object is achieved according to the present invention in that the detector surface is illuminated with the decoupled light via a light-scattering system and used for detecting the decoupled light pulses.

Thus, no reference surface is required in the method according to the present invention. The detector surface is illuminated over a large surface area via the light-scattering system, so that the individual optoelectronic elements on the detector surface each receive two light pulses, namely, the decoupled light pulse, which has virtually no optical signal propagation time, and a light pulse which has been reflected on an object and therefore is delayed by a corresponding optical signal propagation time. For each optoelectronic element on the detector surface, the detection times of the decoupled light pulses then provide a time reference which allows the propagation time of the electronic signals to be compensated for for each individual element. This allows a propagation time calibration with high spatial resolution, using comparatively few optoelectronic elements, namely, only the optoelectronic elements of the detector surface.

The method allows a simple design of the LIDAR sensor, since only the beam splitter and the light-scattering system are needed for the calibration. If necessary, the calibration may be updated at any time and may be carried out continuously during the ongoing measuring operation.

Advantageous refinements and embodiments of the present invention are described herein.

Based on the signals of a trigger circuit for the light source, for example a semiconductor laser, points in time at which the light pulses are emitted, or more precisely, the points in time of the rising edges of the light pulses, may be determined relatively accurately. During the calibration this information may be used for identifying a time window within which the detection of the decoupled light pulses is to be expected. In this way, the detection signals used as a time reference may be distinguished from the signals that are reflected on objects, and also from interference signals, for example due to interference from extraneous light.

The evaluation circuit contains electronic time measuring devices, for example so-called time-to-digital converters (TDCs), with which the detection times are measured pixel by pixel. According to one advantageous refinement of the present invention, the light source may be operated in a mode in which it emits double pulses whose time interval is accurately known. Any drift of the time measuring devices may then also be recognized and compensated for by comparing the measured time interval between the associated detection times.

A further subject matter of the present invention relates to a LIDAR sensor which is configured for carrying out the calibration method described above.

Exemplary embodiments of the present invention are explained in greater detail below with reference to the figures.

DETAILED DESCRIPTION OF EXAMPLE EMBODIMENTS

Figure 1:
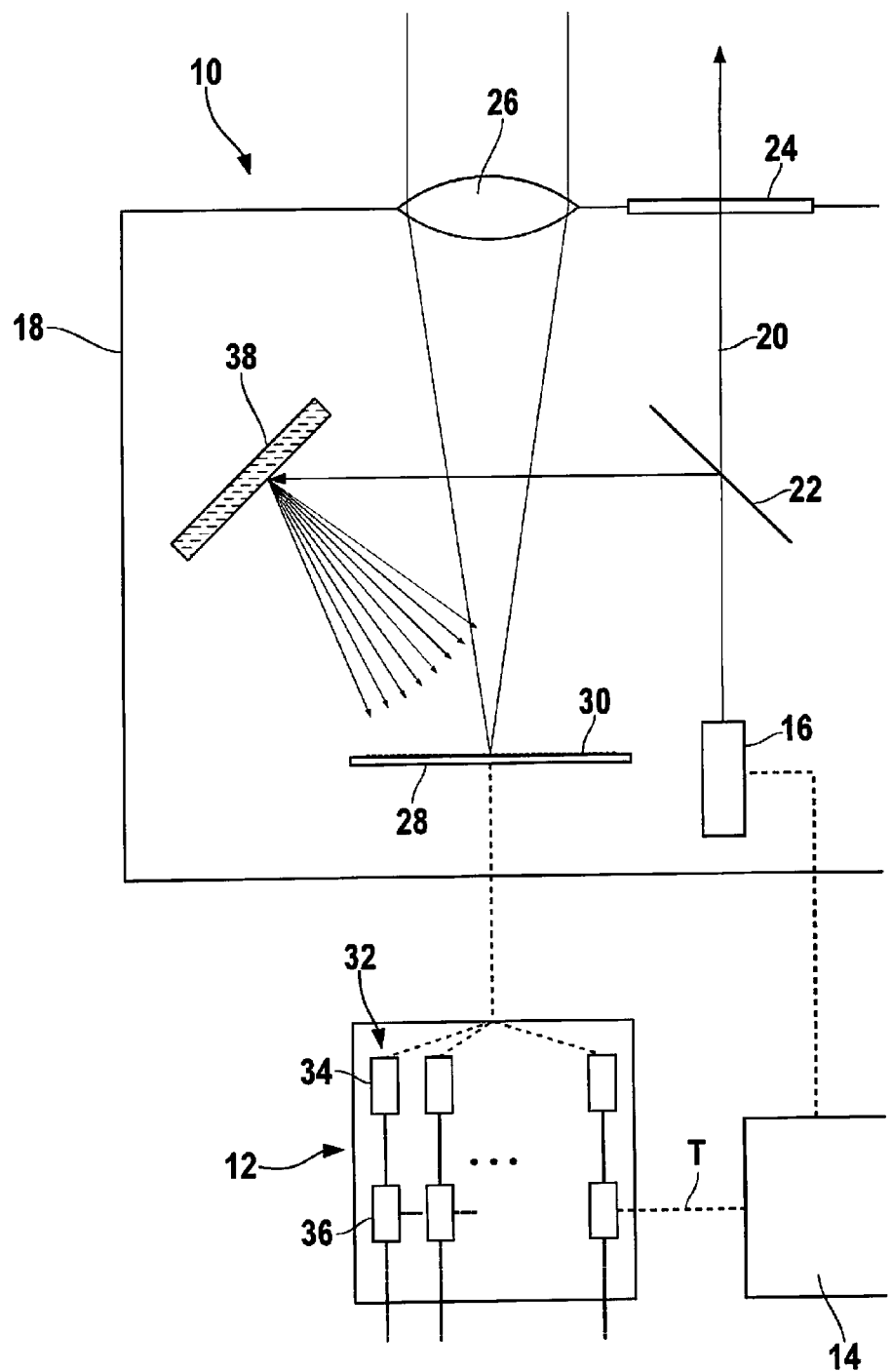
FIG. 1 shows a schematic diagram of a LIDAR sensor according to one specific embodiment of the present invention.

The LIDAR sensor shown in FIG. 1 includes an optical unit 10, and an electronic portion in optical unit 10 which includes an evaluation circuit 12 and a trigger circuit 14 for a light source 16, preferably a laser light source such as a semiconductor laser.

Optical unit 10 includes a housing 18 which accommodates light source 16 and other components of the optical unit. A laser beam 20 generated by light source 16 is emitted into the surroundings via a beam splitter 22 in the form of a partly silvered mirror and via an exit window 24 of the housing 18. Laser beam 20 is generally periodically deflected with the aid of a deflection system, not shown here, so that the laser beam sweeps over a certain angle range or solid angle range. When the laser beam strikes objects in this angle range or solid angle range, a portion of the light is reflected, and is received by a lens 26 of optical unit 10 and focused on a detector surface 28 which includes a plurality of optoelectronic elements 30. If laser beam 20 is deflected only one-dimensionally, optoelectronic elements 30 are situated in a row. If the laser beam is deflected two-dimensionally and thus sweeps over a certain solid angle range, optoelectronic elements 30 are situated two-dimensionally on detector surface 28, so that a two-dimensional image of the surroundings is obtained.

The optical signal received at each point (pixel) of detector surface 28 is converted into an electronic signal by electrooptical (optoelectronic) element 30, for example a CCD element, present at that location. The electronic signals are transmitted to evaluation circuit 12 and undergo further evaluation there.

Light source 16 is controlled by trigger circuit 14 in such a way that the light source emits a sequence of short light pulses having a duration in the range of several nanoseconds, for example. Evaluation circuit 12 receives trigger pulses T from trigger circuit 14 which indicate the start of each light pulse. For each optoelectronic element 30, evaluation circuit 12 includes an evaluation channel 32 which includes a detector circuit 34 for detecting the light pulse, and at least one time measuring circuit 36 with which, for example, the time interval between the detection signal of detector circuit 34 and the associated trigger pulse may be measured. Detector circuit 34 may be designed, for example, in such a way that it compares the electronic signal, which may have already been digitized in associated optoelectronic element 30, to a threshold value in order to recognize the start of a received light pulse.

However, since the signal routing and signal processing in evaluation circuit 12 take a certain amount of time, which with respect to the optical signal propagation time, i.e., the propagation time of the light pulses from the LIDAR sensor to the object and back to the LIDAR sensor, cannot be ignored, a calibration with regard to the electronic signal propagation times is necessary. For this purpose, a portion of the light of pulsed laser beam 20 is decoupled with the aid of beam splitter 22 and directed onto a light-scattering system 38, which may be formed by a diffusion disk, for example. The diffusion disk is situated in such a way that it diffusely directs the light that is decoupled by beam splitter 22 onto detector surface 28, so that the latter is essentially uniformly illuminated. As soon as light source 16 emits a light pulse, each optoelectronic element 30 on detector surface 28 thus receives a decoupled light pulse from light-scattering system 38 virtually without delay (since the optical path lengths within optical unit 10 are negligibly small). The reflected light pulse then also strikes the same optoelectronic element 30 only with a certain delay, which is a function of the distance from the particular located object. Both light pulses (or their rising edges) are detected by detector circuit 34 of the associated evaluation channel.

The detection time of the decoupled light pulse is used as a time reference for the propagation time measurement. It is thus possible to correct the propagation time measurements in all evaluation channels with respect to the propagation time of the electronic signals, as explained in greater detail below with reference to FIG. 2.

Figure 2:
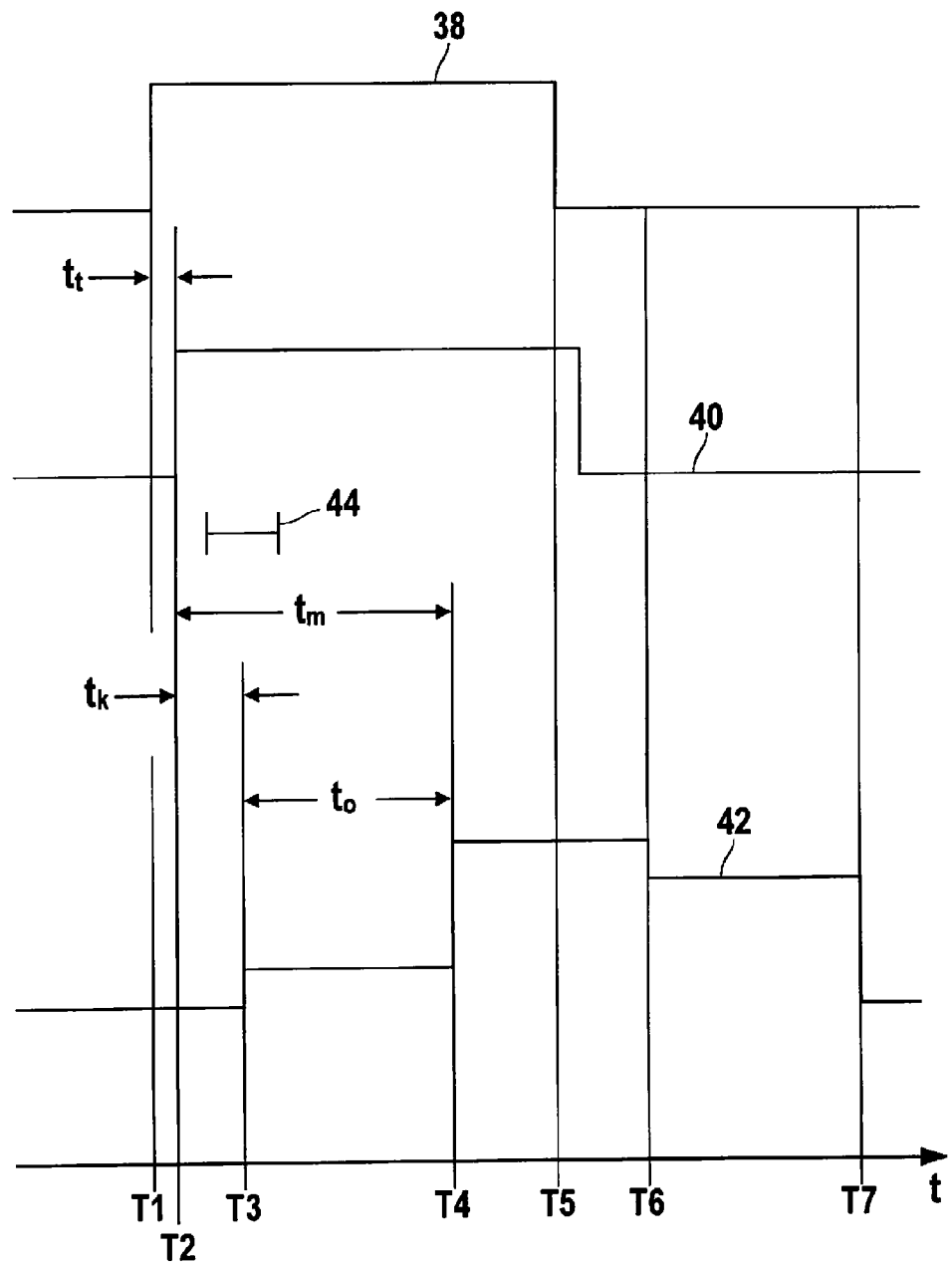
FIG. 2 shows a time diagram for explaining the calibration method.

In FIG. 2, upper curve 38 shows the pattern of an individual pulse of the laser beam emitted by light source 16, as a function of time t. Next lower curve 40 shows the change over time of associated trigger pulse T, the way it is received in one of time measuring circuits 36. There is a time offset $t_t$ between curves 38 and 40 which corresponds to the signal propagation time of the trigger signal from trigger circuit 14 to time measuring circuit 36 in question. Curve 42 in FIG. 2 indicates the strength of the signal detected by detector circuit 34.

On the time scale shown at the bottom in FIG. 2, a point in time T1 indicates the rising edge of the pulse of the laser beam, and a point in time T2 indicates the rising edge of the associated trigger pulse. At an even later point in time T3, detection circuit 34 of the evaluation channel in question has detected the start of the decoupled light pulse, which has arrived at detector surface 28 via light-scattering system 38. The light pulse which is reflected on the object and focused on the detector surface via lens 26 is detected at point in time T4.

At point in time T5, the light pulse represented by curve 38 ends, and thus so does the light pulse, decoupled by beam splitter 22, which has arrived at the detector surface via the diffusion disk. However, due to the propagation time of the electronic signal, the end of this light pulse is not detected until point in time T6. The fall of the light pulse, which has returned to detector surface 28 from the object, is then also detected at point in time T7.

The time interval between points in time T2 and T3 is denoted by reference character $t_k$ in FIG. 2. The time required for the electronic signal to reach the input of time measuring circuit 36 from detector surface 28 is given by the distance between points in time T1 and T3, and thus has length $t_t+t_k$. However, this time cannot be directly measured via the time measuring circuit. Rather, only time $t_k$ between the arrival of trigger pulse T and the detection of the decoupled light pulse is measurable.

However, the time between the detection of decoupled light pulse at T3 and the detection of the actual locating signal, i.e., the light pulse reflected on the object at T4, is also directly measurable. This time is denoted here by reference character $t_o$, and directly indicates the optical signal propagation time, from which distance d of the object may be computed: $d=c\, t_o/2$, where c is the speed of light.

As long as a portion of each light pulse is decoupled with the aid of beam splitter 22, optical signal propagation time $t_o$ may thus be directly measured, so that the calibration with regard to the propagation time of the electronic signal takes place automatically, in a manner of speaking.

For this purpose, it is necessary only for the jump in curve 42 to be unambiguously associatable with the decoupled light pulse at T3. Propagation time $t_t$ of the trigger pulse and the propagation time of the electronic signal from detector surface 28 to time measuring circuit 36 are at least approximately known, so that difference $t_k$ between these time periods may be estimated. As soon as the trigger pulse arrives at the time measuring circuit at point in time T2, it is thus possible to determine a time window 44 (centered on point in time T3) within which the rising edge of the decoupled light pulse is to be expected. When detector circuit 34 then actually establishes a significant rise of the received signal within this time window, it may be concluded with a high level of certainty that this is the start of the decoupled light pulse.

The time interval between points in time T2 and T4 is denoted by reference character $t_m$ in FIG. 2. This variable $t_m$ is also measurable, so that there is also an alternative option for determining optical signal propagation time $t_o$, by measuring $t_m$ and $t_k$ and subtracting these variables one from the other.

If the calibration is to be carried out only occasionally, not continuously, it is possible to remove beam splitter 22 or render it inoperative, so that correspondingly more intensity is available for emitted laser beam 20. Once time $t_k$ has been measured and stored, $t_o$ may still be determined as difference $t_m - t_k$, even if no light pulses are decoupled and therefore point in time T3 is not detectable.

By use of the calibration method described herein, it is possible, for example, to compensate for temperature changes of the LIDAR sensor in the range of −40° C. to +100° C. and for the changes in propagation time thus caused, so that the object distances may be measured with a spatial resolution of several cm, or an even higher resolution.

Figure 3:
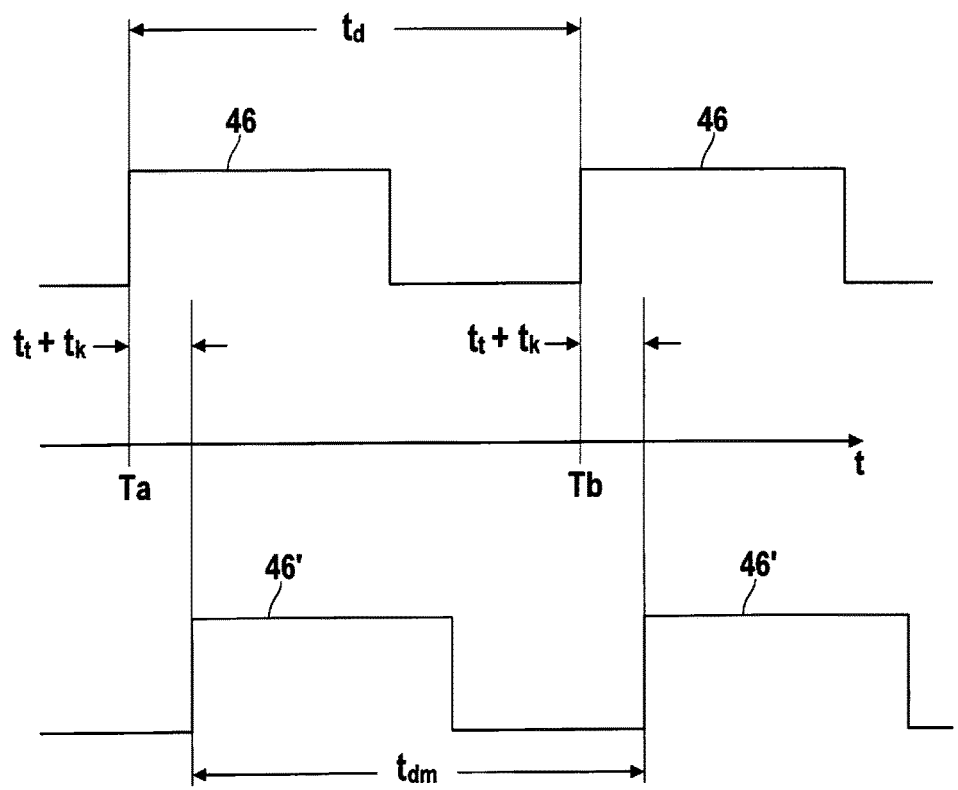
FIG. 3 shows a time diagram for explaining a method for calibrating time measuring devices.

FIG. 3 illustrates one option for also testing time measuring circuits 36 in FIG. 1 and calibrating them if necessary. The upper curve in FIG. 3 illustrates two successive light pulses 46. These may be two regular light pulses of light source 16, or also a double pulse generated specifically for test purposes. It is important for trigger circuit 14 to be designed in such a way that time interval $t_d$ between light pulses 46 (between their rising edges) is reproducible with high accuracy and known. The lower curve in FIG. 3 shows two associated pulses 46' in the electronic signal which detector circuit 34 delivers to time measuring circuit 36, and which is effectuated by the reception of the decoupled light on detector surface 28. Both pulses 46' are delayed with respect to light pulses 46 by the same time interval ($t_t + t_k$). When time measuring circuit 36 is operating correctly, distance $t_{dm}$ between pulses 46', which is measured by this time measuring circuit, should therefore be equal to known distance $t_d$. If this is not the case, this indicates a drift or some other error in the time measuring circuit, which may be corrected by an appropriate calibration (for example, multiplication by a calibration factor).

Alternatively, if the length of light pulses 46 is accurately known, the time interval between the rising edge and the falling edge of an individual pulse may also be tested.

Figure 4:
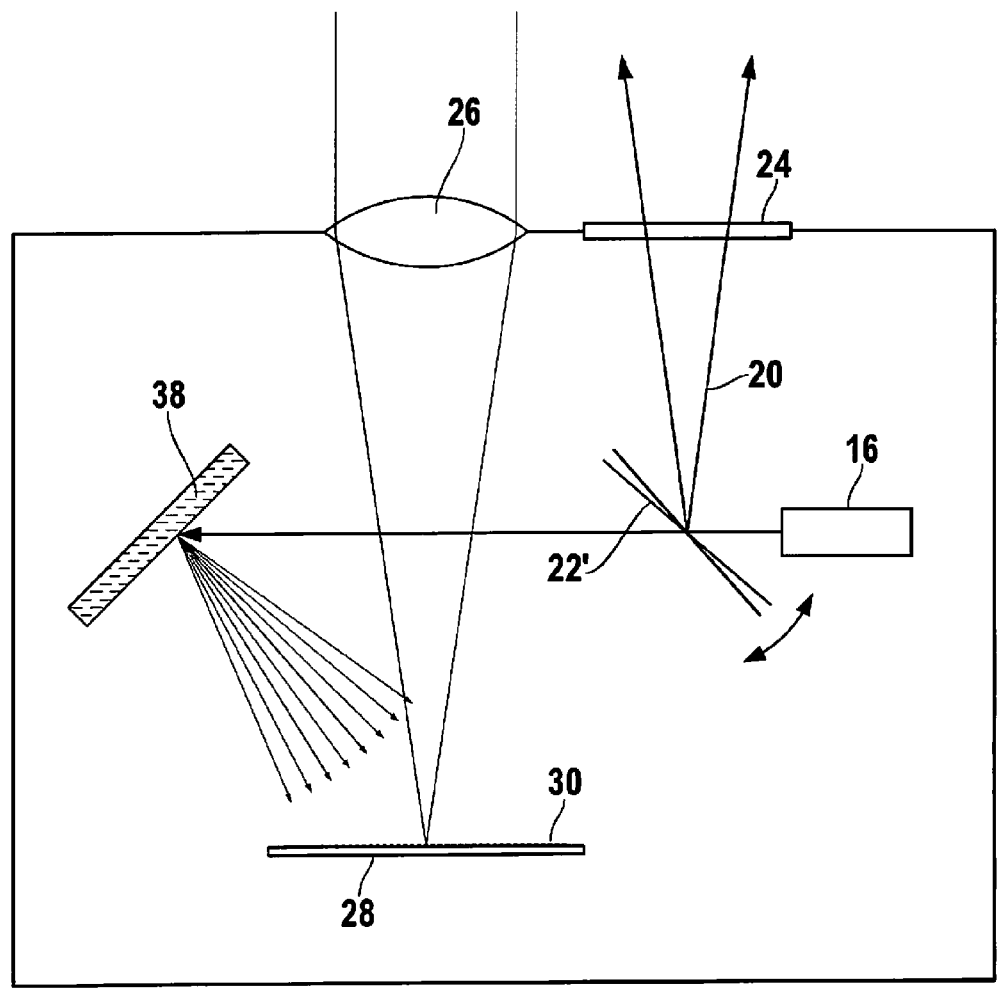
FIG. 4 shows a sketch of a LIDAR sensor according to one modified exemplary embodiment.

FIG. 4 shows one exemplary embodiment of a LIDAR sensor, with a beam splitter 22' whose partly silvered mirror is oscillatingly pivotable, and which at the same time may thus form the deflection mirror for pivoting laser beam 20. In this case, light source 16 is situated in such a way that the laser beam emitted into the surroundings is reflected on the mirror, while the decoupled beam passes through the mirror without being significantly deflected.

What is claimed is:

1. A method for propagation time calibration of a LIDAR sensor which includes a pulsed light source, a detector surface with a plurality of optoelectronic elements for receiving light pulses of the light source reflected on objects and for converting the light pulses into electronic signals, and an electronic evaluation circuit for detecting the light pulses and for measuring the propagation times thereof, the method comprising:
    correcting the measured propagation times with respect to the propagation times of the electronic signals in the evaluation circuit by decoupling, for at least some of the light pulses, a portion of the light, using a beam splitter at the light source, and using detection times of the decoupled light pulses as a time reference,
    wherein the detector surface is illuminated with the decoupled light via a light-scattering system and used for detecting the decoupled light pulses,
    wherein the detector surface is illuminated by the received and reflected light pulses that were not transmitted via the light-scattering system,
    wherein the light source is controlled by a trigger circuit which also delivers a trigger pulse to the evaluation circuit, and
    wherein the evaluation circuit determines a time window that begins after a rising edge of the trigger pulse and ends before the detector surface is illuminated by the received and reflected light pulses, and
    wherein a rising edge in a signal detected by the detector surface corresponds to a detection of a corresponding one of the decoupled light pulses as the time reference only if the rising edge in the signal detected by the detector surface occurs in the time window.

2. The method as recited in claim 1, wherein calibrated propagation times of optical signals are obtained by measuring the time interval between the detection of the decoupled light pulse and the detection of the light pulse that is reflected on the object.

3. The method as recited in claim 1, wherein the time interval between arrival of the trigger pulse in the evaluation circuit and the detection of the decoupled light pulse is measured and stored in a mode in which a portion of the light of the light source is decoupled, and the propagation time calibration takes place based on the stored interval in a mode in which no light is decoupled.

4. The method as recited in claim 1, wherein light of the light source is modulated in such a way that there is a known time interval between two pulse edges, and a time measuring circuit in the evaluation circuit is calibrated by detecting corresponding pulse edges in the decoupled light pulses and comparing a time interval between the pulse edges, which is measured with the time measuring circuit, to the known time interval.

5. A LIDAR sensor, comprising:
    a pulsed light source;
    a detector surface with a plurality of optoelectronic elements for receiving light pulses of the light source reflected on objects and for converting the received light pulses into electronic signals;
    an electronic evaluation circuit for detecting the light pulses and for measuring the propagation times thereof; and
    a beam splitter situated at the light source, the beam splitter decoupling a portion of the light emitted by the light source and directs it onto a light-scattering system which is situated in relation to the detector surface in such a way that the detector surface is illuminated by the decoupled and scattered light, wherein the detector surface is illuminated by the received and reflected light pulses that were not transmitted via the light-scattering system, wherein the light source is controlled by a trigger circuit which also delivers a trigger pulse to the evaluation circuit, and wherein the evaluation circuit determines a time window that begins after a rising edge of the trigger pulse and ends before the detector surface is illuminated by the received and reflected light pulses, and wherein a rising edge in a signal detected by the detector surface corresponds to a detection of a corresponding one of the decoupled light pulses as the time reference only if the rising edge in the signal detected by the detector surface occurs in the time window.

6. The LIDAR sensor as recited in claim 5, wherein the light-scattering system is a diffusion disk.

* * * * *